United States Patent [19]
Akhteruzzaman et al.

[11] Patent Number: 6,067,346
[45] Date of Patent: May 23, 2000

[54] METHOD AND SYSTEM FOR PROVIDING REDUNDANCY IN SECURITY SYSTEMS SERVED BY A PUBLIC SWITCHED TELEPHONE NETWORK

[75] Inventors: Akhteruzzaman, Naperville; Ronald Joseph Rees, Bolingbrook; Ian Andrew Schorr, Chicago, all of Ill.

[73] Assignee: Lucent Technologies Inc., Murray Hill, N.J.

[21] Appl. No.: 09/215,828

[22] Filed: Dec. 18, 1998

[51] Int. Cl.$^7$ .................................................. H04M 11/04
[52] U.S. Cl. ............................ 379/39; 379/33; 379/44; 340/531
[58] Field of Search .................................... 379/33, 37, 39, 379/40, 44, 45, 93.07, 100.14; 348/152, 153, 154, 155; 455/41; 340/531, 532, 533; 375/202

[56] References Cited

U.S. PATENT DOCUMENTS

| | | | |
|---|---|---|---|
| 3,937,889 | 2/1976 | Bell, III et al. | 179/2 |
| 5,164,979 | 11/1992 | Choi | 379/44 |
| 5,454,024 | 9/1995 | Lebowitz | 379/39 |
| 5,675,626 | 10/1997 | Davis | 379/40 |
| 5,737,391 | 4/1998 | Dame et al. | 379/33 |
| 5,930,526 | 7/1999 | Iverson | 395/853 |

Primary Examiner—Curtis A. Kuntz
Assistant Examiner—Melur Ramakrishnaiah
Attorney, Agent, or Firm—Mony R. Ghose

[57] ABSTRACT

A method and system for providing redundancy for security systems served by the public switched telephone network (PSTN) includes a cable modem interconnected to a security system controller. Upon detection of inoperability of a telecommunications line serving the system via the PSTN, the cable modem extends an alert message to a security monitoring service via a packet data network. Advantageously, the cable modem can also send video images and audio from the secured premises to the security monitoring system due to the bandwidth capabilities of the packet data network.

13 Claims, 6 Drawing Sheets

*FIG. 6*

METHOD AND SYSTEM FOR PROVIDING REDUNDANCY IN SECURITY SYSTEMS SERVED BY A PUBLIC SWITCHED TELEPHONE NETWORK

CROSS-REFERENCE TO RELATED APPLICATION

This application is related to the applications of:

Akhteruzzaman, Ronald J. Rees and Ian A. Schorr entitled "Method and System For Using Telecommunications Equipment For Detecting And Responding To A Security System Breach"; and Akhteruzzaman, Ronald J. Rees and Ian A. Schorr entitled "Method And System For Responding To Security System Breaches Via A Wireless Network" which applications are assigned to the assignee of the present application and which are being filed concurrently herewith.

TECHNICAL FIELD

This invention relates to security systems and, more particularly, to detecting a security breach occurring as a result of an inoperable telecommunications line and alerting a monitoring system of the breach via a packet data network.

BACKGROUND OF THE INVENTION

Functional security systems alert dwelling occupants and emergency authorities of a violation of the secured premises. A typical security system includes a controller interconnected by wireless or wireline connections to sensors deployed at strategic locations throughout the dwelling. In a home, sensors are usually deployed in doorways, windows and other ports of entry. Motion sensors may also be placed strategically within the home to detect movement while carefully positioned smoke and heat sensors detect the presence of fire.

Security systems are usually interconnected to a central monitoring service system via a telecommunications line. The central monitoring service system is maintained by a security service provider and continuously monitors all activated security systems for sensor breaches. A sensor breach occurs when the sensor detects the opening of a door or window or the presence of movement or fire. A sensor breach causes the sensor to send a signal to the controller of the security system. Responsive to receiving a breach signal, the controller issues an audible alarm to the occupants of the dwelling and originates a call to the central monitoring service system via the telecommunications line. Upon receiving the breach notification, the central monitoring service system determines the type of breach, attempts to contact the dwelling occupants and alerts appropriate authorities of the emergency situation.

Normally, the telecommunications line interconnecting the security system to the central monitoring service system is the dwelling occupants' telephone line. This line usually emanates and is visible from the exterior of the dwelling. It is this telecommunications line which delivers a security breach signal (i.e., a call) to the central monitoring service system via telecommunications equipment.

To circumvent the security system from issuing a signal to the central monitoring service system, one need only render the telecommunications line inoperable. If the telecommunications line is severed, a breach signal from the security system will not be sent to the telecommunications equipment and hence, the central monitoring service system. As a result, the central monitoring service system remains unaware of an alarm situation at the secured premises and emergency authorities are not notified.

Although some security systems are equipped with a "line cut" option which alerts dwelling occupants of telecommunications line damage, there continues to be a need for efficiently and effectively alerting authorities when a telecommunications line interconnected to a security system is inoperable.

SUMMARY OF THE INVENTION

This need is addressed and a technological advance is achieved by the method and system of the present invention for alerting authorities whenever a telecommunications line interconnected to a security system becomes inoperable. More particularly, the present invention acts as a default system when a communication link between a security system and a traditional telecommunications network (i.e., the public switched telephone network) is severed.

In a normal mode of operation, a security system is interconnected to a central monitoring service system via a telecommunications line interconnected to the public switched telephone network (PSTN). In the event of inoperability of this telecommunications line, the security system issues an alert message which is delivered to the central monitoring service system via a cable modem and a packet data network. Advantageously, the central monitoring system serving the security system is able to detect potentially dangerous situations even when the telecommunications link interconnecting the systems is inoperable. The redundancy provided by the packet data network provides an extra measure of security for the occupants of the secured premise and also enables video or audio transmissions from the secured premises to the central monitoring service system due to the bandwidth capabilities of most packet data networks.

In another embodiment, the security system generates a high frequency modulated signal upon detection of an abnormality in the telecommunications line interconnected to the PSTN. This high frequency modulated signal is transmitted by a first portion of a severed line to a second portion of the severed line which is interconnected to PSTN equipment. The PSTN equipment uses the high frequency modulated signal to originate a call to the central monitoring service system. In this manner, subscribers of security system monitoring services are ensured action even when the connection between their security systems and the monitoring service is inoperable.

DETAILED DESCRIPTION

Figure 1:
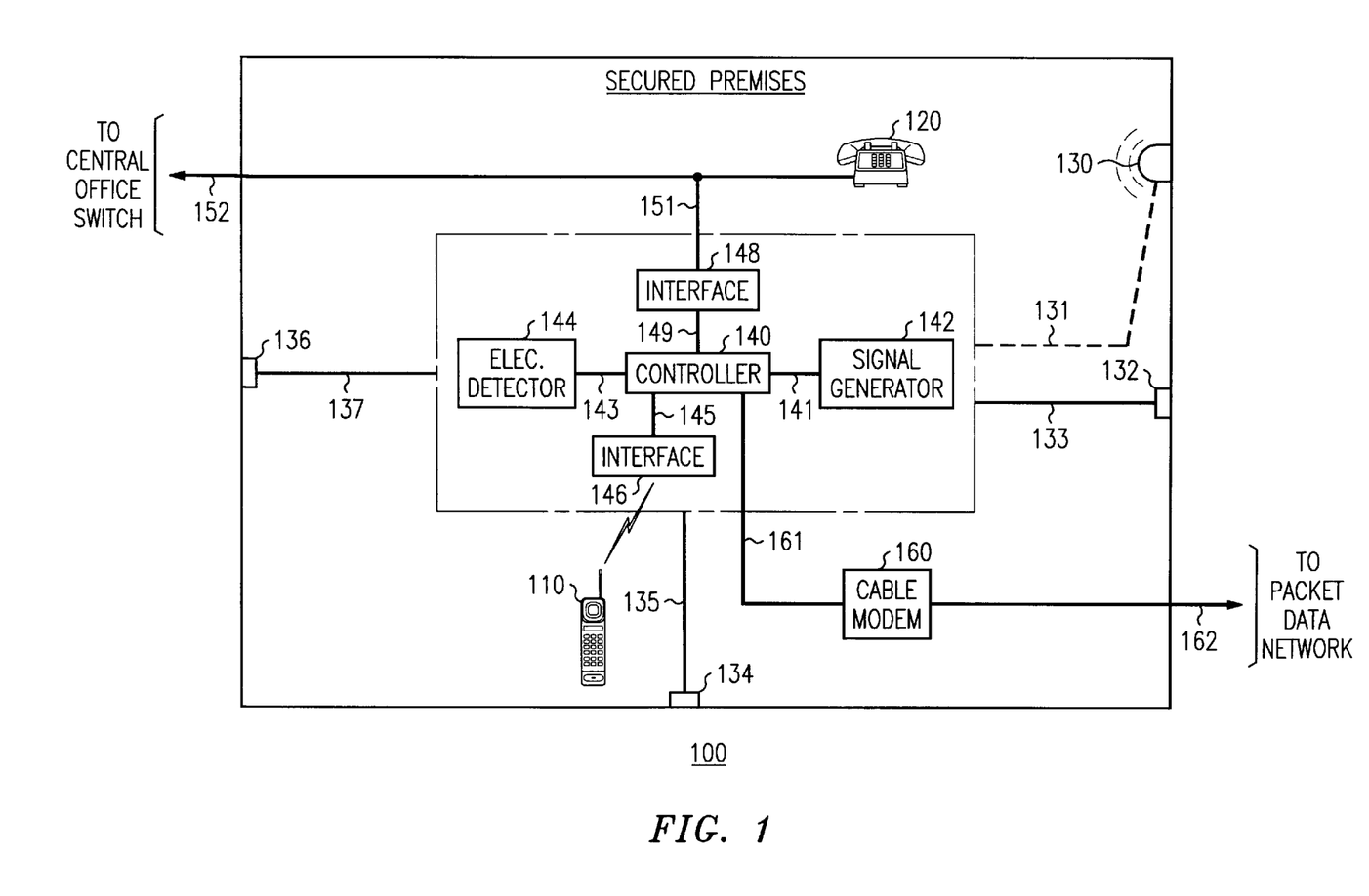
FIG. 1 shows a simplified block diagram of a security system at a secured premises.

FIG. 1 shows secured premises 100, or a structure protected by a security system 102. In this example, the security system protecting secured premies 100 comprises wireless unit 110, customer premises equipment 120, sensors 130, 132, 134 and 136 and controller 140.

Controller 140 is interconnected to signal generator 142, electrical parameter detector 144 and wireless interface 146 via links 141, 143 and 145, respectively. Telephone line interface 148 is interconnected to controller 140 via link 149. Link 151 drops from system 102 to telephone line 152 for interconnecting customer premises equipment 120 and the security system to the serving telecommunications equipment. In this example, the telecommunications equipment is a central office switch which provides the occupants of secured premises 100 regular telephone service.

Sensors 130, 132, 134 and 136 serve as security breach detectors for the security system. Sensor 130 is a motion and fire detector which communicates with system 102 via wireless link 131. Sensor 132 is a window sensor hard wired to system 102 via link 133. Sensor 134 is a door sensor hard wired to system 102 via link 135 and sensor 136 is another window sensor interconnected via wire 137 to the system. In the event of a breach (such as motion, heat or the unauthorized opening of windows 132, 136 or door 134), an alarm signal is sent from the sensor to system 102 via a designated link and received in controller 140.

Cable modem 160 interconnected to security system controller 140 via link 161. In this example, cable modem 160 serves a personal computer located on the premises and as a backup system for alerting the central monitoring service system in the event of inoperability of telecommunications line 152 (see FIG. 6). Link 162 interconnects the cable modem to a packet data network as described in FIG. 2.

Also shown interconnected to security system 102 is wireless unit (telephone) 110. Wireless unit 110 includes a processor for activating an emergency call protocol in response instructions received from controller 140 and memory for storing subscriber data and telephone numbers. Wireless unit 110 may also include an announcement circuit for issuing messages to called parties.

In response to receiving an alarm signal, controller 140 normally extends an alarm message to a central monitoring service system via traditional public-switched telecommunications equipment. In this example, the security breach message is sent by system 102 via telecommunications line 152 to a serving central office switch. Subsequently, the central office switch originates a call to the central monitoring service system. In the event of inoperability of telecommunications line 152, however, the security system is disabled. In other words, no messages are transmitted from the security system to the central monitoring service system.

Figure 2:
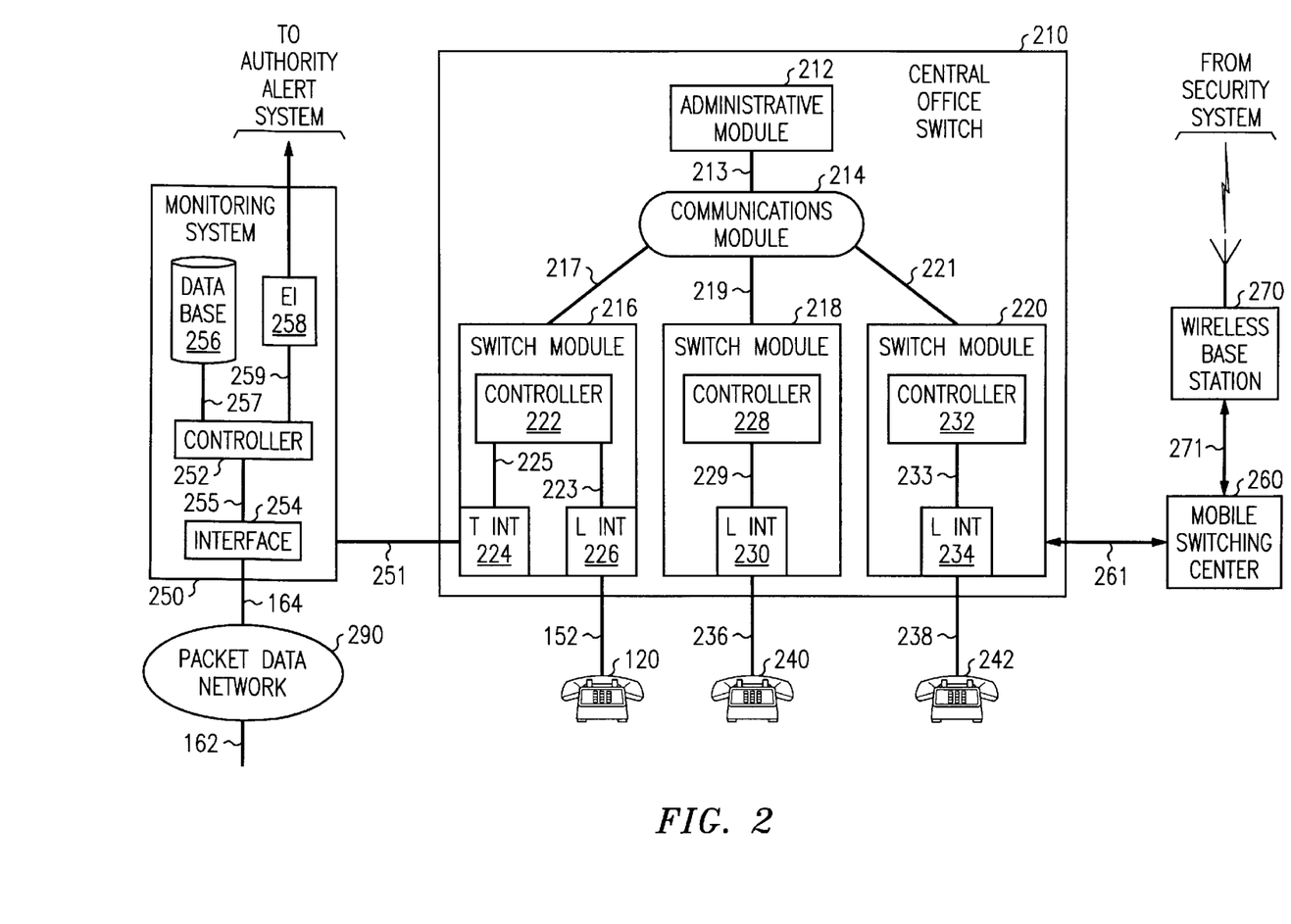
FIG. 2 is a simplified block diagram of a telecommunications system which serves the security system equipment shown in FIG. 1.

FIG. 2 is a simplified block diagram of telecommunications network 200. Telecommunications network 200 comprises central office switch 210, central security monitoring service system 250, mobile switching center 260, wireless base station 270 and packet data network 290.

Central office switch 210 includes administrative module 212 interconnected to communications module 214 via link 213. The communications module is connected to switch modules 216, 218 and 220 via links 217, 219 and 221, respectively. Administrative module 212 handles billing, maintenance and test operations for all components within central office switch 210. Communications module 214 relays messages among switch modules and between the switch modules and the administrative module. Each switch module includes a controller and a line interface for serving particular customer premises equipment. Each switch module controller includes memory for storing subscriber information identified by the subscriber's telecommunications line. In other embodiments, subscriber information is stored in an external database accessible by the switch module. The switch module controller also includes an algorithm for detecting electrical abnormalities for each of the lines which it serves. The data required for operation of the algorithm is retrieved from line interface equipment which measures electrical properties of a line using well known metallic loop testing procedures.

Switch module 216 includes controller 222 interconnected to line interface equipment 226 via link 223. Line interface equipment 226 serves telephone line 152 which is interconnected to customer premises equipment 120, as shown in FIG. 1. Switch module 216 includes trunk interface 224 for interconnecting the switch module to central security monitoring system 215 via line or trunk 251. In some embodiments trunk 251 may interconnect to the central monitoring system via other switches in the public switched telephone network. Switch module 218 includes controller 228 interconnected to line interface unit 230 via link 229. Line interface unit 230 serves subscriber line 236 which is interconnected to customer premises equipment 240. Switch module 220 includes controller 232 interconnected to line interface 234 via link 233. Switch module 220 serves subscriber line 238 which is interconnected to customer premises equipment 242. Although each switch module is shown serving only one interface of customer premises equipment, other embodiments include switch modules serving a plurality of customer premises equipment.

Also shown in mobile switching center 260 which is interconnected to switch module 220 via trunk 261. Mobile switching center 260 serves wireless base station 270 via link 271.

Central monitoring service system 250 includes controller 252 interconnected to communications interface 254, database 256 and emergency interface 250 via links 255, 257 and 259, respectively. Communications interface 254 enables central security monitoring system 250 to receive calls from traditional telephone switches or from a packet data network. Subscriber data is stored in database 256 and is used by controller 252 for retrieving address and subscriber profile information in response to emergency alert messages. Emergency interface 258 interconnects central security monitoring system 250 to networks operated by various emergency personnel, such as fire, police or hospitals Also shown is packet data network 290 interconnected to central monitoring service system 250 via data link 164.

Figure 3:
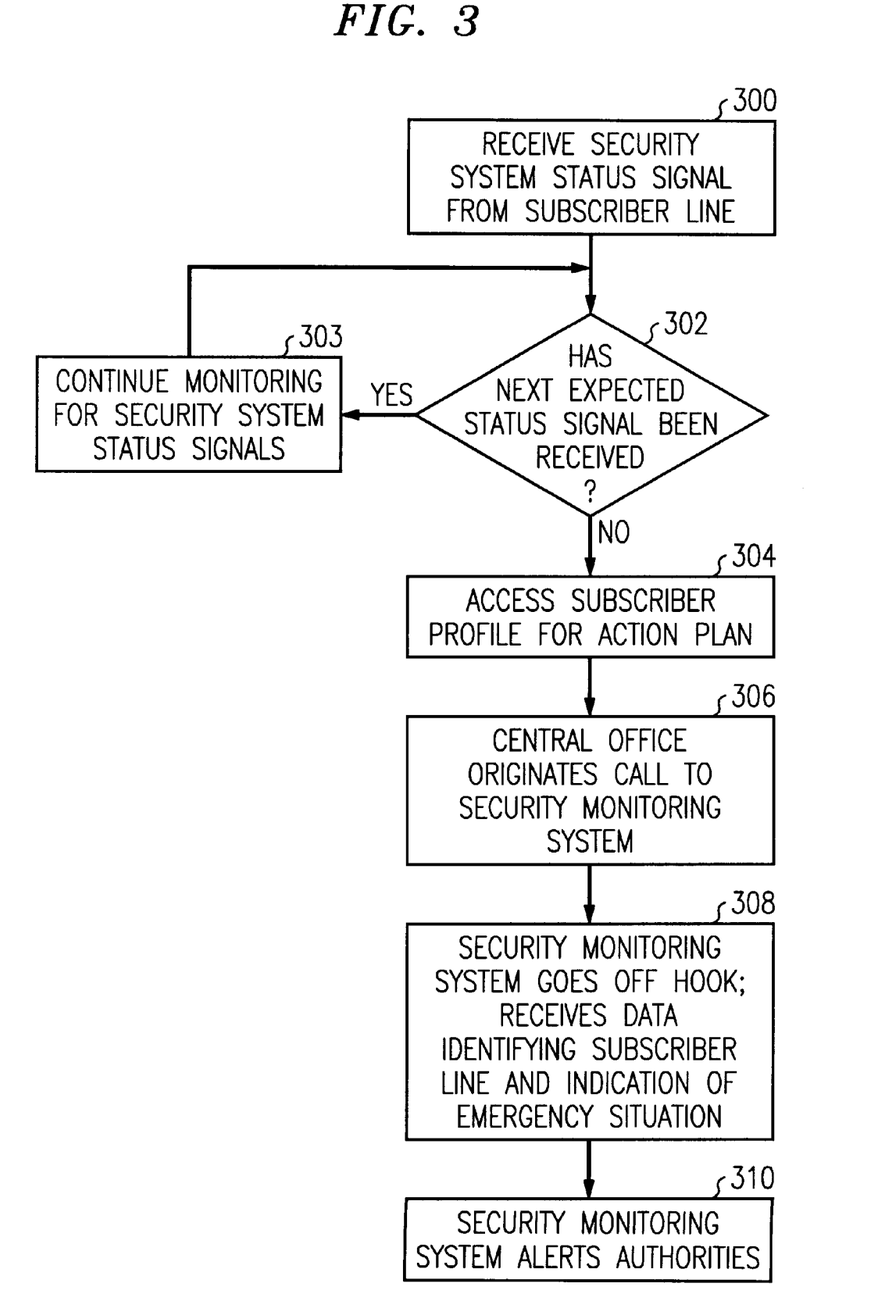
FIG. 3 is a flow diagram illustrating the steps performed in the systems of FIGS. 1 and 2 in accordance with a first embodiment of the present invention.

FIG. 3 is a flow diagram illustrating the steps performed by the security system of FIG. 1 and the telecommunications network of FIG. 2 in accordance with the first embodiment of the present invention. The first embodiment of the present invention assumes a security system designed for continuous monitoring of a telephone line by telecommunications equipment.

The process begins in step 300 in which a serving telecommunications equipment (in this case, a central office switch) receives a system status signal from a telecommunications line interconnected to the system. In decision step 302, the central office switch determines whether the next expected security system status signal has been received in accordance with a predetermined system status signal frequency. If the outcome of decision step 302 is a "YES" determination, the process continues to step 303, in which the central office switch continues to monitor the telecommunications line for system status signals. If the outcome of decision step 302 is a "NO" determination, the process continues to step 304, in which the central office switch accesses a subscriber line profile for an appropriate action plan. The profile is stored in the switch module controller and includes data identifying subscriber terms for reaction to a missed system status signal. For example, some subscribers may elect to allow multiple missed signals to occur before the central office switch takes action while other subscribers may prefer the central office switch to immediately originate a call to the central monitoring system upon the absence of a system status signal.

The process continues to step 306 in which it is assumed the central office switch must take some action in response to a missed signal. In this step, the central office switch originates a call to central security monitoring system 250. More particularly, the central office switch extends a message (e.g., in the form a call issuing DTMF tones) to the central security monitoring system via line 251. The message includes data identifying the subscriber line from which the status signal is absent. In step 308, the central monitoring service system receives the alert call from the central office switch. A message including subscriber line data and the indication of a telecommunications line cut situation is downloaded by the switch to the central monitoring service system. In the preferred embodiment, the message issued by the switch is in dual tone multifrequency (DTMF) tone format. In step 310, the central monitoring service system recognizes the indication of a line cut emergency associated with the subscriber line identified and alerts the appropriate authorities via the emergency interface 258.

In an alternative embodiment, the central office switch monitors the telecommunications line for an electrical abnormality. Upon detection of any abnormal electrical parameter (such as changes in voltage, current or impedance) of a telecommunications line termination, the central office switch initiates a call to the central monitoring service system.

Figure 4:
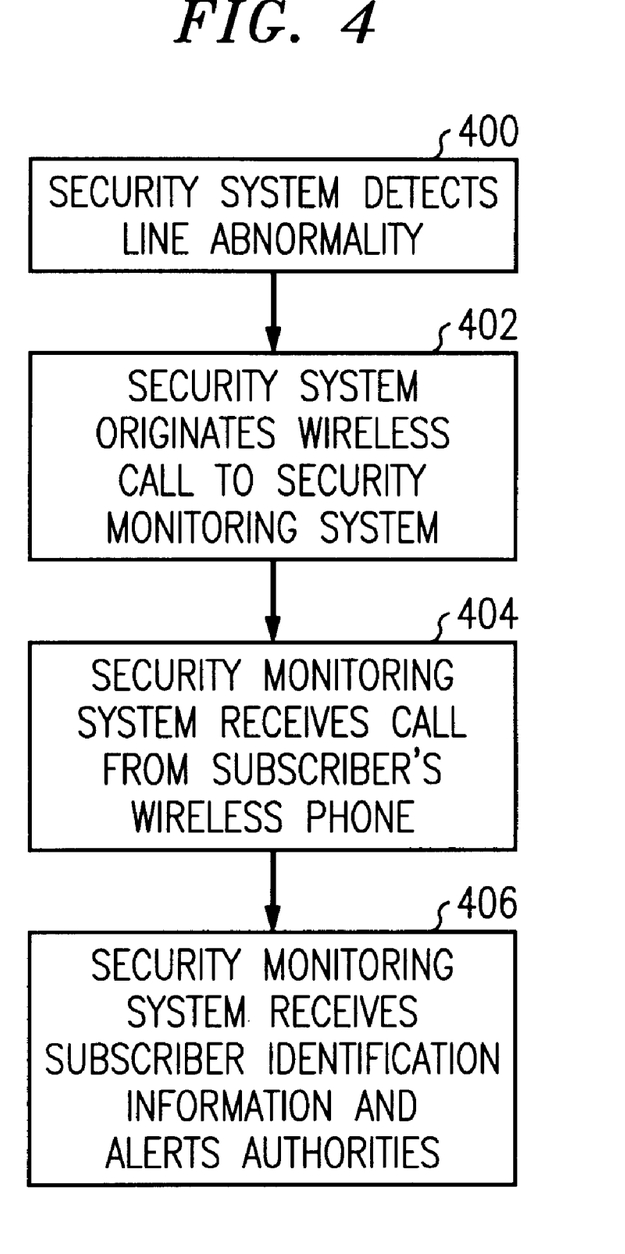
FIG. 4 is a flow diagram illustrating the steps performed in the system of FIGS. 1 and 2 in accordance with a second embodiment of the present invention.

FIG. 4 is a flow diagram illustrating the steps performed in accordance with a second embodiment of the present invention. In this embodiment, a wireless call is placed by a security system wireless telephone to the central monitoring service system upon inoperability of a wireline telecommunications line.

The process begins in step 400, in which the security system detects a damaged or inoperable telecommunications line. The line inoperability may be determined by a change in the electrical properties of the line recognized by electrical parameter detector 144. In step 402, the controller originates a wireless call to the central monitoring service system in response to the line inoperability. More particularly, the security system, as shown in FIG. 1, initiates a call to the central monitoring service system using wireless phone 110.

Wireless phone 110 is programmed to dial a call and issue data when telecommunications line 152 is inoperable and cannot relay messages to the serving central office switch. In these situations, wireless phone 110 automatically places a call to central monitoring service system 250. In this example, wireless phone 110 is served by wireless base station 270 which initiates a call to central monitoring service system 250 by extending a message to mobile switching center 260. Mobile switching center 260 interconnects wireless phone 110 to central monitoring service system 250 via central office switch 210. When the incoming call from wireless phone 110 is received in central monitoring service system 250, the central monitoring system awaits DTMF tones which the wireless phone has been programmed to provide. These tones identify the subscriber served by the security system issuing the call and the indicate the presence of a telecommunications line abnormality or the status of sensor breaches at a secured premises. After completion of the call to the central monitoring service system, the wireless phone may be programmed to call other numbers (e.g., relatives, ambulance) and play a prerecorded message identifying an emergency and requesting help. In step 406, the central monitoring service system obtains the subscriber identification information from the DTMF tones generated by, the wireless phone and alerts the appropriate authorities via emergency interface 258.

Figure 5:
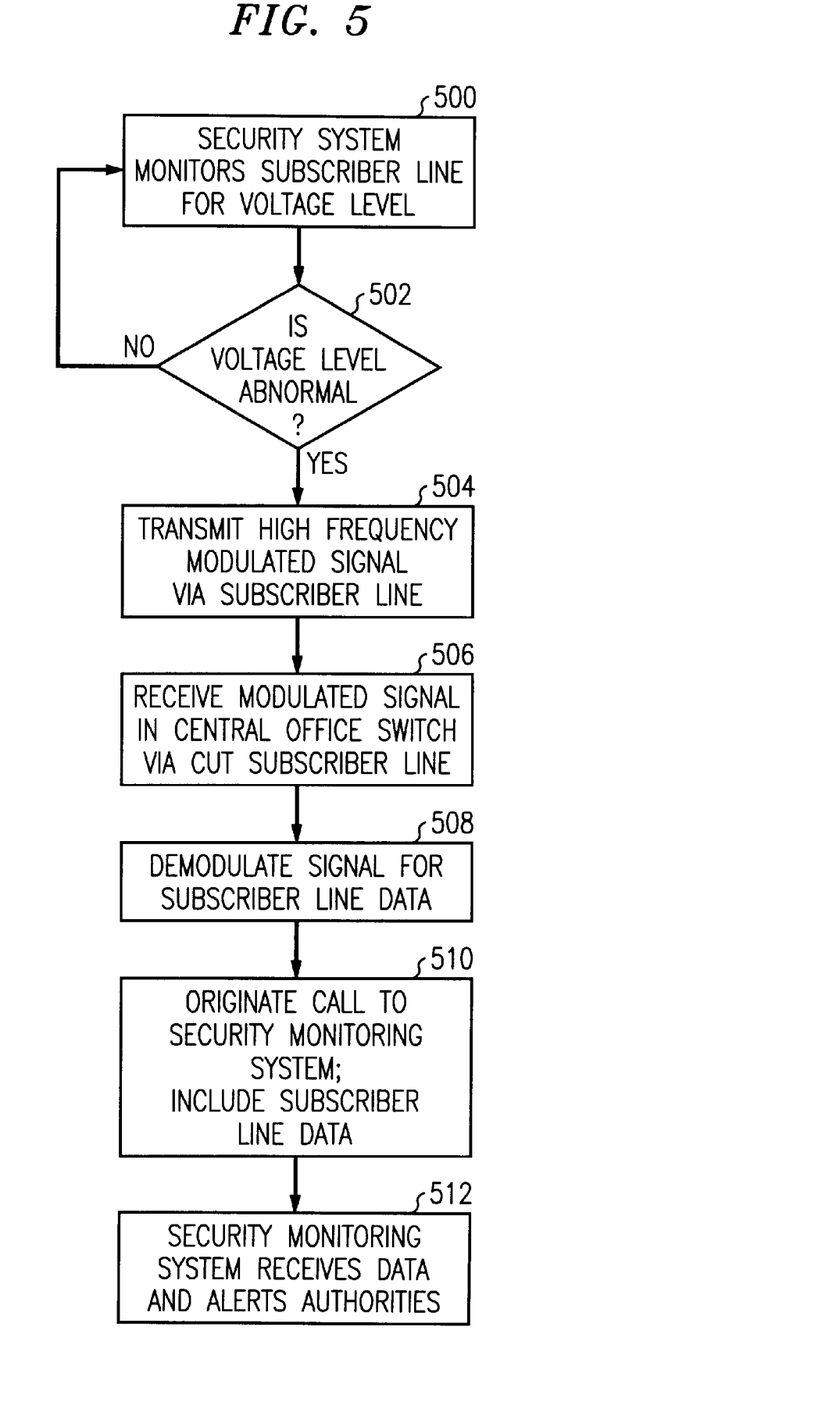
FIG. 5 is a flow diagram illustrating the steps performed in the systems of FIGS. 1 and 2 in accordance with a third embodiment of the present invention.

FIG. 5 is a flow diagram illustrating the steps performed in accordance with the third embodiment of the present invention. In this embodiment, it is assumed that the secured premises security system monitoring the telecommunications line is initialized to recognize electrical abnormalities of its serving telecommunications line and that the line is severed.

The process begins in step 500, in which the security system operates in normal mode and monitors its serving telecommunications line. In this example, assume that the security system shown in FIG. 1 monitors telecommunications line 152 for its voltage level using electrical parameter detector 144. In alternative embodiments, the telephone line may be monitored for its impedance level or some other electrical parameter. In decision step 502, the security system controller determines whether the voltage level is abnormal. Typically, if telecommunications line 152 is severed, the voltage level will fall from an initial value (−39.5 to −57.5 volts) to zero volts. If the outcome of decision step 502 is a "NO" determination, the process returns to step 500, in which the electrical parameter continues to be monitored. If the outcome of decision step 502 is a "YES" determination, the process continues to step 504, in which controller 140 transmits an issue command to signal generator 142.

In response to receiving this command, signal generator 142 issues a high frequency modulated signal on the damaged telecommunications line. The high frequency signal is approximately 1–5 MHz frequency hopping or with a cycle time fast enough to transmit approximately 100–150 feet. In this example, a first portion of the severed telephone line acts as a transmitter of a high frequency modulated signal and a second portion of the severed telecommunications line acts as a receiver of the high frequency modulated signal. Thus, in step 506, the receiving portion of the severed telephone line receives the high frequency modulated signal from the transmitting portion of the telephone line and transmits this signal to the central office switch.

The process continues to step 508, in which the central office switch receives the high frequency modulated signal and demodulates it to determine the identification of the subscriber line issuing the signal. This demodulation step occurs in the switch module using algorithms stored in the switch module controller. The demodulation algorithm identifies the subscriber line issuing the signal. The subscriber line identification may be used to access other subscriber data. In step 510, the central office switch identifies the subscriber line issuing the high frequency modulated signal and originates a call to the central monitoring service system. In step 512, the central monitoring service system receives the subscriber data via DTMF tones and alerts an appropriate emergency authority.

Figure 6:
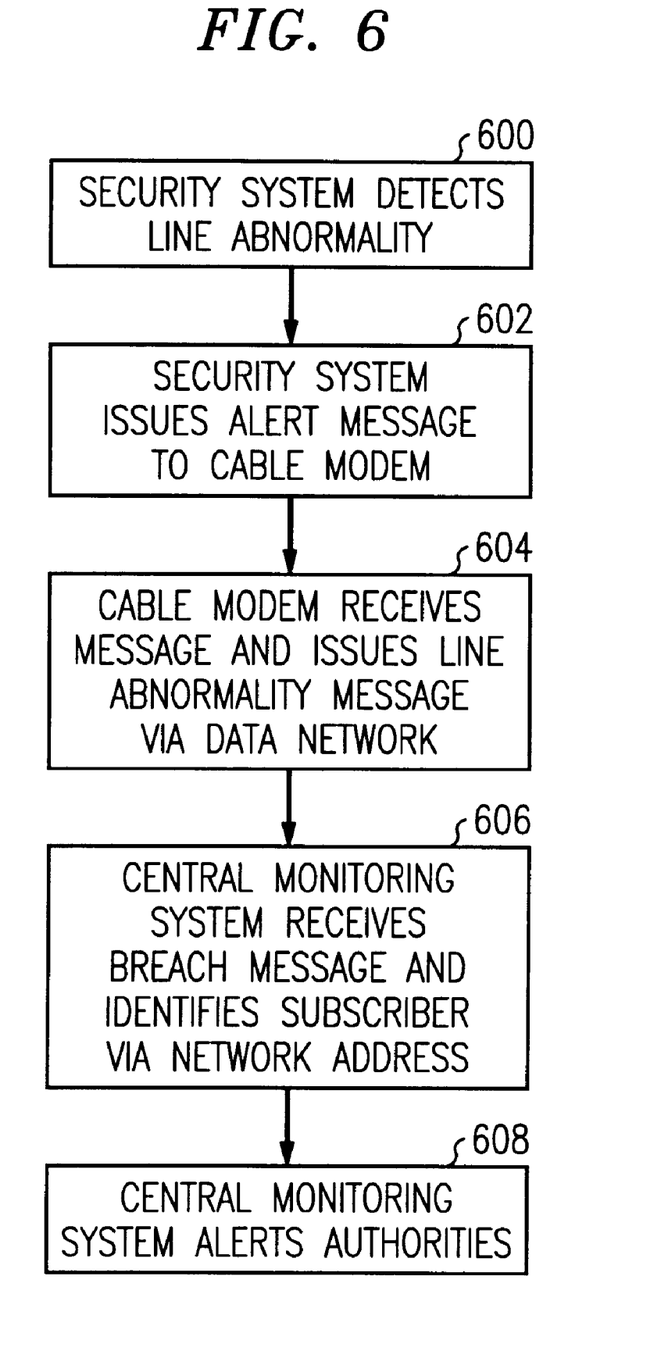
FIG. 6 is a flow diagram illustrating the steps performed in the systems of FIGS. 1 and 2 in accordance with a fourth embodiment of the present invention.

FIG. 6 is a flow diagram depicting the steps performed in the systems of FIGS. 1 and 2 in accordance with a fourth embodiment of the present invention. In this embodiment, it is assumed that a cable modem is interconnected to the security system on the secured premises and is initialized to respond to telecommunications line abnormality detection.

The process begins in step 600 in which the security system detects the line abnormality. This line abnormality may be detected in accordance with the above-identified detection implementation. In step 602, the security system issues an alert message to a cable modem interconnected to the security system controller. In the examples of FIGS. 1 and 2, security system controller 140 issues an alert signal to cable modem 160 via link 161. In step 604, the cable modem receives the alert message and issues a line abnormality message to the central monitoring service system via link 162 which interconnects the cable modem to a packet data network. In this example, the alert message arrives in packet data network 190 via link 162 and is forwarded to central monitoring service system 250 via data link 164.

The process continues to step 606 in which the central monitoring service system receives the line breach message or emergency identification message in its communications interface 254 and identifies the subscriber line associated with the line breach via the network address information transmitted by the packet data network. In step 608, the central monitoring service system alerts appropriate authorities of the line abnormality after accessing the subscriber profile in database 256. In alternative embodiments the cable modem may also be interconnected to a video camera or microphone located on the secured premises so that a video or audio feed to the central monitoring service system may be provided via the packet data network.

Advantageously, in each of the above-described embodiments, a security system operates even when its telecommunications connection is severed. In other words, subscribers of security system services are assured that even if their telephone line is severed, the central monitoring service system will be notified of the abnormality and can respond accordingly.

Although this invention has been described with respect to various illustrative embodiments, numerous other arrangements may be devised without departing from the scope of the present invention. For example, any system in which interconnection to telecommunications equipment is required can benefit from the present invention which allows an emergency signal to be sent in event of inoperability of the telephone line.

What is claimed is:

1. A central office switch comprising:

a telecommunications line interconnected to a security system;

means for demodulating a high frequency modulated signal transmitted from a first portion of a severed telecommunications line to a second portion of the severed telecommunications line without processing by an intermediate unit; and means for originating a call to a central monitoring service in response to receiving the high frequency modulated signal.

2. The central office switch of claim 1 wherein the high frequency modulated signal contains information about the security system from which it emanated.

3. The central office switch of claim 1 wherein information from the demodulated signal is relayed to the central monitoring service by the central office switch.

4. A telecommunication device which is coupled by a telecommunications line to a remote system, the telecommunication device comprising:

means for demodulating a high frequency modulated signal transmitted from a first portion of a severed telecommunications line to a second portion of the severed communications line; and means for originating an alert in response to receiving the high frequency modulated signal.

5. The telecommunication device according to claim 4 wherein the high frequency modulated signal contains information about the remote system from which it emanated.

6. Telecommunication device according to claim 5 wherein the high frequency modulated signal contains information about the remote system from which the specific identity of the remote system can be determined.

7. The telecommunication device according to claim 4 further comprising means for transmitting information derived from the demodulated high frequency signal to another device coupled to the telecommunication device.

8. The telecommunication device according to claim 4 wherein the high frequency modulated signal is propagated by wireless transmission between the first and second portions of the telecommunications line.

9. A method for sensing a communication disruption between a telecommunication device coupled by a telecommunications line to a remote system, method comprising the steps of:

receiving a high frequency signal transmitted from a first portion of a severed communications line to a second portion of the severed communications line; and originating an alert in response to receiving the high frequency signal.

10. The method according to claim 9 wherein the high frequency signal is encoded to carry information about a remote system from which the high frequency signal emanated.

11. The method according to claim 10 wherein the encoded high frequency signal contains information from which the specific identity of the remote system can be determined.

12. The method according to claim 9 further comprising the step of transmitting information derived from the high frequency signal to another device coupled to the telecommunication device.

13. The method according to claim 9 wherein the high frequency signal is propagated by wireless transmission between the first and second portions of the telecommunications line.

* * * * *